F. H. CHAPMAN.
HUB BAND BRAKE.
APPLICATION FILED FEB. 27, 1914.

1,113,877.

Patented Oct. 13, 1914.
2 SHEETS—SHEET 1.

Witnesses:
C. Peinle, Jr.
V. B. Hillyard.

Inventor,
Fay H. Chapman.
By Victor J. Evans,
Attorney.

F. H. CHAPMAN.
HUB BAND BRAKE.
APPLICATION FILED FEB. 27, 1914.
1,113,877.
Patented Oct. 13, 1914.
2 SHEETS—SHEET 2.
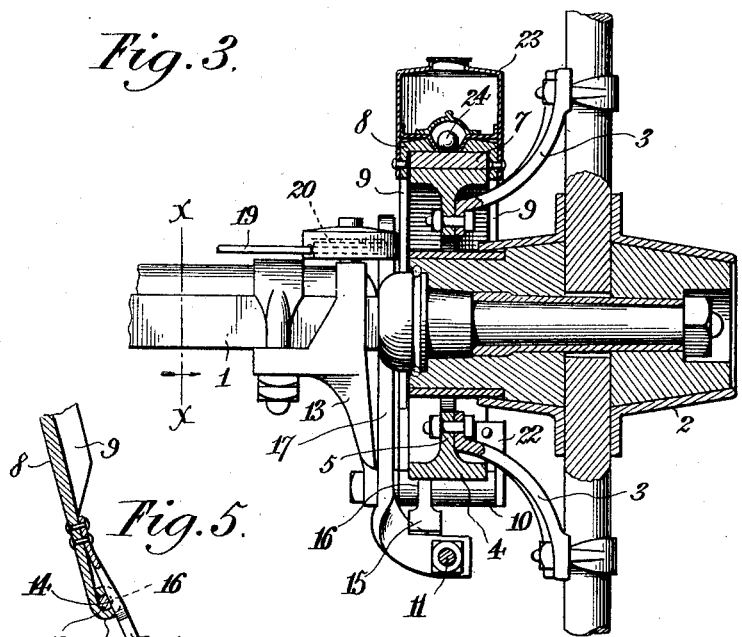
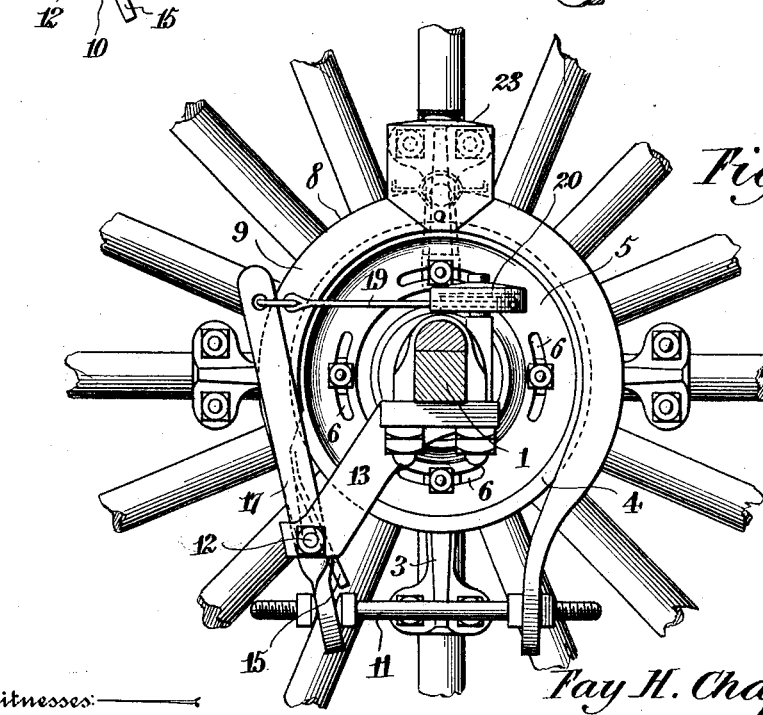
Witnesses:
C. Peinle, Jr.
V. B. Hileyard.
Inventor,
Fay H. Chapman.
By Victor J. Evans,
Attorney.

UNITED STATES PATENT OFFICE.

FAY H. CHAPMAN, OF AVOCA, NEW YORK.

HUB-BAND BRAKE.

1,113,877. Specification of Letters Patent. Patented Oct. 13, 1914.

Application filed February 27, 1914. Serial No. 821,493.

*To all whom it may concern:*

Be it known that I, FAY H. CHAPMAN, a citizen of the United States, residing at Avoca, in the county of Steuben and State of New York, have invented new and useful Improvements in Hub-Band Brakes, of which the following is a specification.

The present invention relates to brake apparatus for vehicles such as buggies, wagons and trucks, the purpose being to apply the force exerted to a band attached to the wheel instead of to the rim of the wheel as is commonly practised.

The invention provides a brake which may be readily applied to any vehicle in use or upon the market, the brake embodying a band which is adapted to be secured to the spokes of the wheel, a brake band mounted upon the axle and adapted to coöperate with the wheel band or rim, means for operating the brake band to cause the same to frictionally engage the wheel band or rim when it is required to apply the brake, means for lubricating the brake and wheel fans, and novel actuating means and mountings for the several parts.

The invention also aims to provide a novel arrangement whereby the wheel may be easily removed from its spindle or placed in position thereon when required without requiring the loosening of bolts or the withdrawing of pins of keys.

The invention also provides a brake of the character specified which is effective and practically out of the way so as not to interfere with the operating parts and which may be removed or quickly repaired when necessary to replace any disabled or worn parts.

The invention consists of the novel features, details of construction and combination of parts, which hereinafter will be more particularly set forth, illustrated and claimed.

Figure 1:
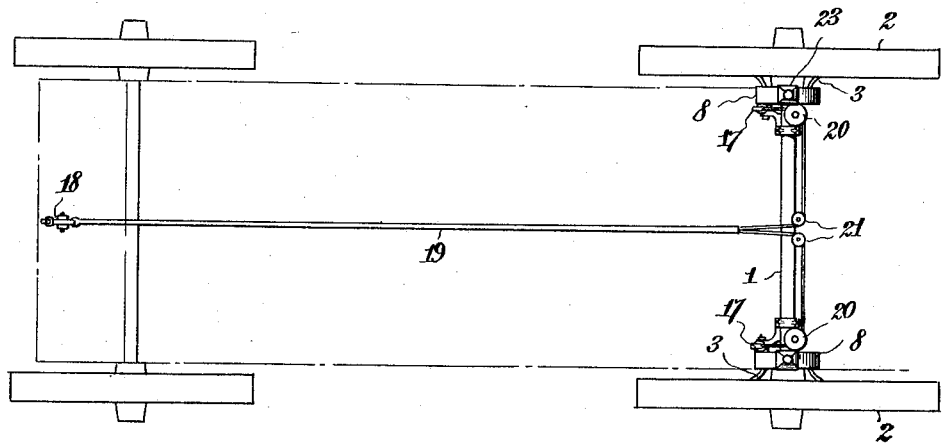
Figure 2:
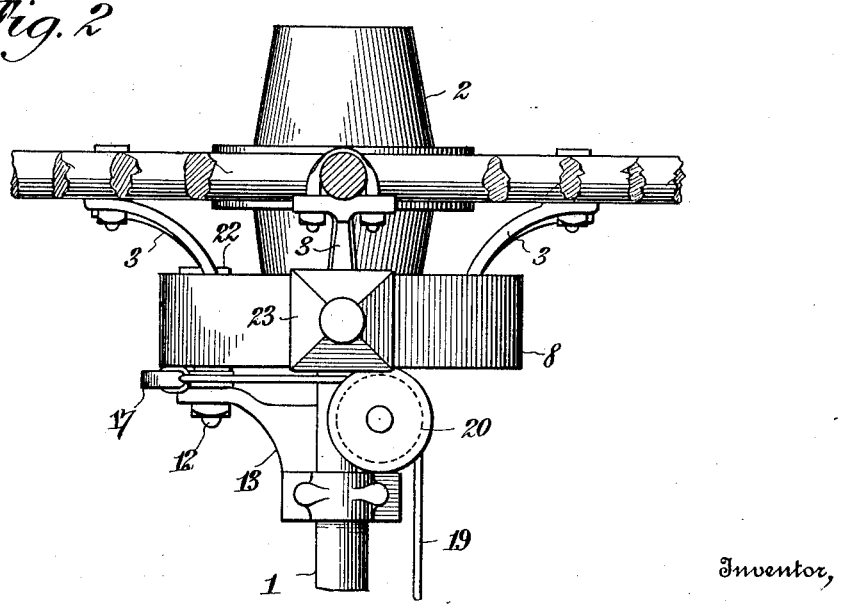

In the drawings hereto attached: Figure 1 is a detail view showing a brake embodying the invention as it appears when installed upon a vehicle. Fig. 2 is a top plan view. Fig. 3 is a sectional view in the plane of the axle and at a right angle to the plane of the wheel. Fig. 4 is a section on the line $x$—$x$ of Fig. 3, looking to the right as indicated by the arrow. Fig. 5 is a detail view showing more clearly the means for detachably connecting the brake band to the pin carried by the bracket attached to the axle.

Corresponding and like parts are referred to in the following description, and indicated in all the views of the drawing, by the same reference characters.

The axle 1 and wheel 2 are well known parts of a vehicle and may be of any construction or design. A plurality of brackets 3 are clipped or otherwise secured to the spokes of the wheel and curve inwardly and toward the axis of the wheel and support the wheel band or rim 4 which is secured to the inner ends of such brackets. The wheel band or rim 4 is formed with a centrally disposed web 5 in which arcuate slots 6 are formed to receive the bolts or fastenings by means of which the wheel band or rim is secured to the inner ends of the brackets 3. The web 5 strengthens the wheel band besides forming convenient means of attaching the brackets 3 thereto. The face of the wheel band 4 is provided with a covering 7 preferably of asbestos which prevents over heating and provides for renewal of the surface when necessary. A brake band 8 coöperates with the wheel band 4 and consists of metal possessing a degree of resiliency so as normally to clear the wheel band. The brake band is provided with side flanges 9 which embrace the edges of the wheel band 4 and covering 7. The brake band extends over and also opposite sides of the wheel band and its ends are extended, one of such ends being bent to form a sleeve or eye 10 and the other end being appertured to receive a rod 11. The sleeve or eye 10 receives a pin 12 which projects laterally from a bracket 13 which is clipped or otherwise secured to the axle 1. The pin 12 is formed in a side with a notch 14 which is adapted to receive a spring catch 15 which is riveted or otherwise secured to the brake band adjacent the bent end 10. The spring catch 15 is adapted to enter the notch 14 formed in a side of the eye or sleeve 10. When the brake band is in position it is held in place upon the pin 12 by means of the spring catch 15 entering the notch 14 of the pin 12. The rod 11 passes through an opening in the lower end of a lever 17 which is mounted upon the pin 12. The lever 17 occupies an upright position and is adapted to be connected in any suitable way to an operating lever 18 located upon the vehicle in convenient position to be reached by the driver. The operating lever 18 may be of any type so as to be moved either by foot or hand. A flexible connection 19 has a cable or chain which connects the lever 17 with the operating lever 18 and passes around guide pulleys 20 and 21. The guide pulley 20 is mounted upon a pin let into the bracket 13. The guide pulley 21 is located upon the axle 1. A plate 22 is secured to a flange of the brake band 8 near the eye or sleeve 10 and receives the pin 12 and serves to strengthen the connection between such pin and brake band.

An oil cup 23 is located at the top of the brake band and is secured thereto and is provided in its bottom with an outlet which is adapted to be closed by means of a ball valve 24. When the brake band is clear of the wheel band the upper portion stands away from the wheel band thereby admitting of the valve 24 closing the outlet of the oil cup, but when the brake band is applied the valve 24 is brought in contact with the wheel band and is moved upwardly thereby exposing a portion of the outlet through which the oil has an unobstructed passage to the brake band for lubricating the same.

It will be understood from the foregoing, taken in connection with the accompanying drawings that the invention is of such a nature as to be readily applied to any vehicle in use or upon the market without requiring any change. The brackets 3 are adapted to be readily secured to the spokes of the wheel and the bracket 13 to be bolted or otherwise fastened to the axle. The provision of the spring catch 15 enables the wheel to be readily removed when it is required to lubricate or grease the same. The spring catch is extended, the extension being so located as to be pressed upon when it is required to disengage the catch from the pin 12.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In a vehicle brake, the combination of a band secured to the spokes of the wheel, a bracket secured to the axle, a brake band arranged to coöperate with the wheel band and having one end connected with the said bracket, a lever mounted upon the bracket, means adjustably connecting the opposite end of the brake band with the lever, a flexible connection attached to the said lever, and a guide pulley mounted upon the aforesaid bracket and having the flexible connection passing therearound.

2. In a vehicle brake and in combination with a wheel band, a brake band arranged to coöperate with the wheel band and having one end formed with a sleeve, a bracket secured to the axle, a pin projecting laterally from such bracket and adapted to pass through the sleeve of the brake band, said pin and sleeve having registering notches, a spring catch secured to the brake band and adapted to engage the notch in the pin to hold the brake band in place thereon, and operating means for such brake band.

In testimony whereof I affix my signature in presence of two witnesses.

FAY H. CHAPMAN.

Witnesses:
LEON J. THRALL,
F. L. ARNOLD.

---

Copies of this patent may be obtained for five cents each, by addressing the "Commissioner of Patents, Washington, D. C."